Jan. 16, 1934.   H. G. HANSON   1,944,081
REAR VIEW MIRROR SUPPORT FOR MOTOR TRUCKS AND THE LIKE
Filed May 24, 1933   3 Sheets-Sheet 2
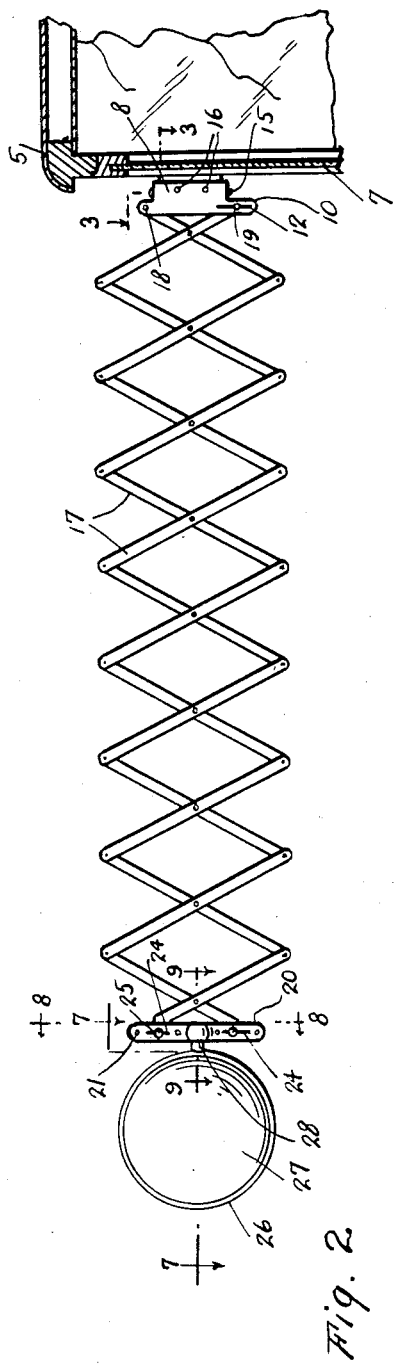
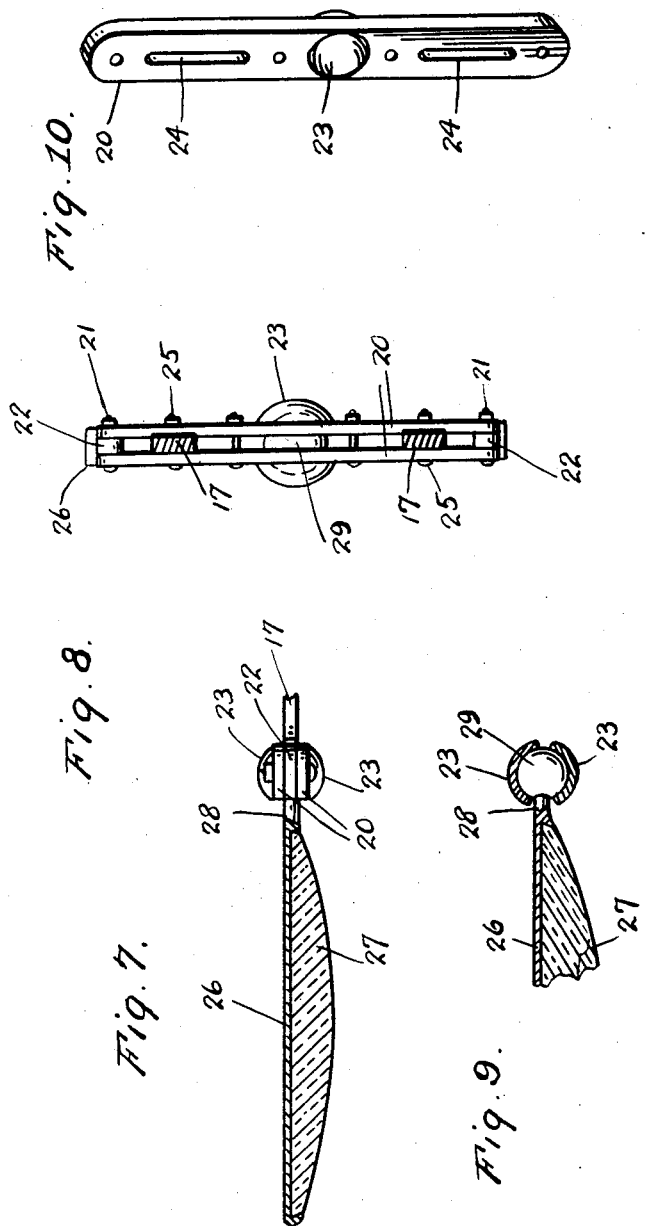
Inventor
*H. G. Hanson*
By *Clarence A. O'Brien*
Attorney Jan. 16, 1934.  H. G. HANSON  1,944,081
REAR VIEW MIRROR SUPPORT FOR MOTOR TRUCKS AND THE LIKE
Filed May 24, 1933  3 Sheets-Sheet 3
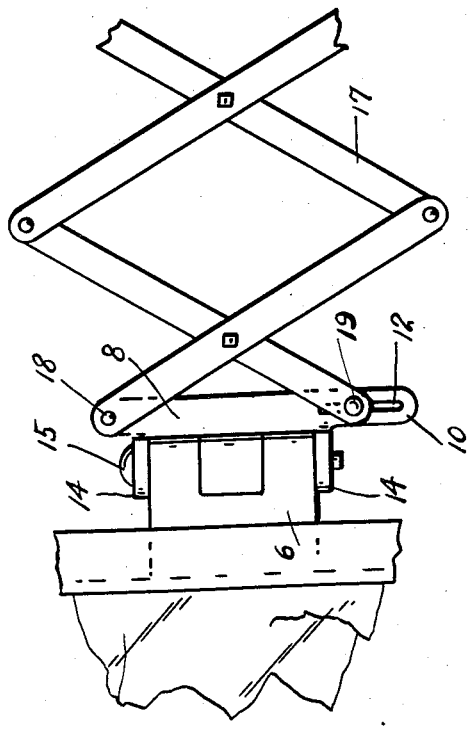
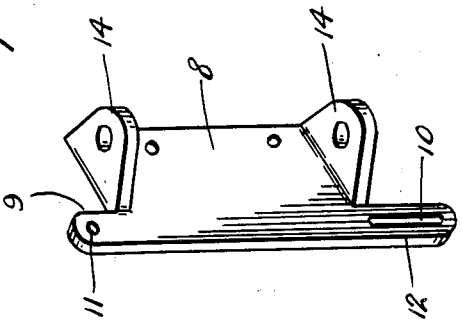
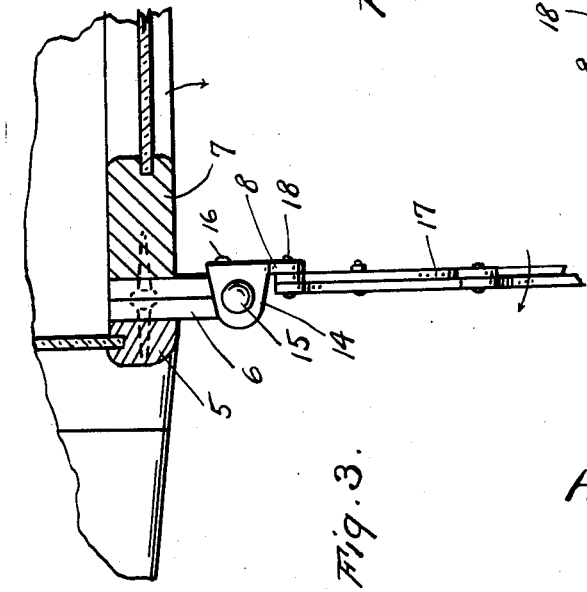
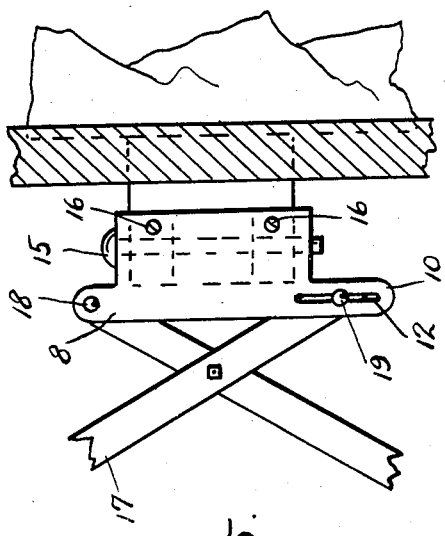
Inventor
H. G. Hanson
By Clarence A O'Brien
Attorney Patented Jan. 16, 1934

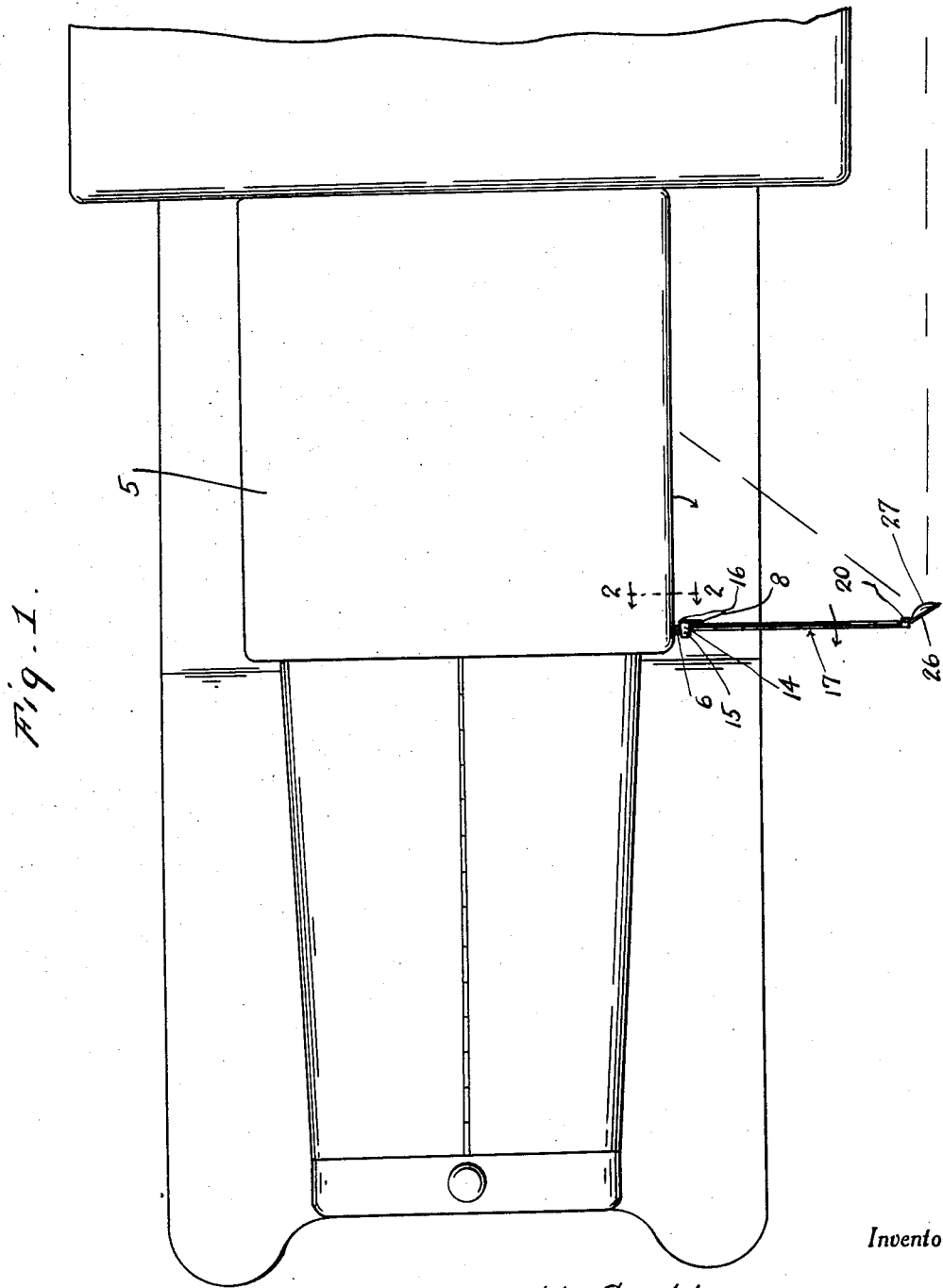

1,944,081

UNITED STATES PATENT OFFICE 1,944,081

REAR VIEW MIRROR SUPPORT FOR MOTOR TRUCKS AND THE LIKE

Helmer G. Hanson, Vienna, S. Dak.

Application May 24, 1933. Serial No. 672,729

2 Claims. (Cl. 45—97)

The present invention relates to a supporting device for a rear view mirror designed particularly for use on trucks and the object of the invention resides in the provision of a supporting structure which permits the mirror to be supported at different distances from the driver's cab so as to accommodate the width of the box on the truck. When the box is of a relatively narrow construction as compared with the cab the mirror is adjusted to a position relatively close to the cab but where the box is of a relatively broad construction the mirror is adjusted outwardly from the cab but, of course, can be moved inwardly when the truck is passing through any narrow way.

Another very important object of the invention resides in the provision of a rear vision mirror supporting structure of this nature which is simple, inexpensive to manufacture, easy to install, efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of the forward portion of a truck showing my mirror supporting structure mounted in place.

Figure 2 is a sectional view taken substantially on the line 2—2 of Figure 1.

Figure 3 is a sectional view taken substantially on the line 3—3 of Figure 2.

Figure 4 is a front elevation of the door hinge and the adjacent portion of the lazy tongue structure.

Figure 5 is a rear elevation thereof.

Figure 6 is a perspective view of the bracket shown reverse from Figures 3, 4 and 5.

Figure 7 is a sectional view taken substantially on the line 7—7 of Figure 2.

Figure 8 is a sectional view taken substantially on the line 8—8 of Figure 2.

Figure 9 is a detail section taken substantially on the line 9—9 of Figure 2, and Figure 10 is a perspective view of one of the socket plates.

Referring to the drawings in detail it will be seen that the numeral 5 denotes a cab of a truck having the usual hinge 6 associated with bar 7.

A bracket comprises a plate 8 having an upper coplanar extension 9 and a lower coplanar extension 10. The extension 9 has an opening 11 and the extension 10 has a slot 12. A pair of apertured ears 14 extend from the upper and lower edges of the plate 8 at right angles thereto and are adapted to extend over the top and bottom of the hinge 6 and the hinge pin 15 extends through the apertures of these ears. The plate 8 is fastened by means of screws or the like 16 to one leaf of the hinge 6 so as to swing with the door 7. Numeral 17 denotes a lazy tongue structure having one end connected to the bracket by having one terminal pivoted on a pin 18 in the opening 11 and a pin 19 in the other terminal slidable in the slot 12. A pair of socket plates 20 are fastened together at their ends by means of bolts 21 and spacers 22 so as to be in spaced parallel coextensive relationship to each other. In the centers of the plates 20 are sockets 23 opposed to each other with the concave faces inwardly. Two slots 24 are provided in each plate 20 one above and one below its socket. The other end of the lazy tongue structure is disposed between these plates 20, each terminal having a bolt or pin 25 slidable in slots 24.

Numeral 26 denotes a mirror frame with a mirror 27 mounted therein. A shank 28 projects from the frame and terminates in a ball 29 having a frictional fit in the socket 23 so that the mirror may be mounted at different angles.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the advantages enumerated in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A rear vision mirror for motor trucks and the like comprising a bracket, means for mounting the bracket on a door hinge, a lazy tongue construction operatively connected with the bracket, a pair of plates, means for holding the plates in spaced parallel coextensive relationship, terminals of the lazy tongue construction having pin and slot connections with the plates, the intermediate portions of the plates having sockets, the concave faces of which oppose each other, a mirror, a frame for the mirror, a shank projecting from the frame and terminating in a ball frictionally engaged in the socket.

2. A rear view mirror supporting structure including, in combination, a bracket comprising a plate having a coplanar upper extension and a coplanar lower extension, the upper and lower edges of the plate being provided with right angularly extending apertured ears to receive a hinge pin, a lazy tongue structure having one end engaged with the bracket by one terminal being pivoted to the upper extension and the other terminal having a pin and slot connection with the lower extension, a pair of socket plates, means for holding the socket plates in spaced coextensive parallel relationship, the other end of the lazy tongue structure extending between said plates and the terminals of said other end having pin and slot connections therewith, said plates being formed with sockets having concaved faces opposed to each other, a mirror, a frame for the mirror, a shank extending from the frame and terminating in a ball frictionally seated in the sockets.

HELMER G. HANSON.